United States Patent [19]

Liu

[11] Patent Number: 4,710,534

[45] Date of Patent: Dec. 1, 1987

[54] LOW GLOSS, FLAME RETERDANT, IMPACT RESISTANT POLYCARBONATE COMPOSITION

[75] Inventor: Ping Y. Liu, Naperville, Ill.

[73] Assignee: General Electric Company, Mt. Vernon, Ind.

[21] Appl. No.: 806,499

[22] Filed: Dec. 9, 1985

[51] Int. Cl.[4] .............................................. C08K 5/06
[52] U.S. Cl. .................................... 524/411; 524/412; 525/67; 525/146; 525/394
[58] Field of Search ................. 525/67, 146, 394, 411, 525/412

[56] References Cited

U.S. PATENT DOCUMENTS

| Re. 31,165 | 3/1983 | Serini et al. | 525/146 |
| 3,130,177 | 4/1964 | Grabowski | 525/67 |
| 3,852,393 | 12/1974 | Furakawa et al. | 525/146 |
| 3,981,843 | 9/1976 | Yoshizaki et al. | 525/67 |
| 4,208,489 | 6/1980 | Schmidt | 524/413 |
| 4,257,937 | 3/1981 | Cohen et al. | 525/67 |
| 4,264,487 | 4/1981 | Fromuth et al. | 525/67 |
| 4,267,096 | 5/1981 | Bussink et al. | 525/67 |
| 4,526,926 | 7/1985 | Weber et al. | 525/146 |
| 4,539,370 | 9/1985 | Nouvertné et al. | 525/146 |
| 4,559,388 | 12/1985 | Liu et al. | 525/146 |

FOREIGN PATENT DOCUMENTS 105244 9/1982 European Pat. Off. .

OTHER PUBLICATIONS

Nassar, T. R. et al—J. Applied Polymer Science, vol. 23, 85–89 (1979).
Wahrmund et al—J. Applied Polymer Science, vol. 22, 2155–2164 (1978).

*Primary Examiner*—Veronica P. Hoke
*Attorney, Agent, or Firm*—Martin B. Barancik

[57] ABSTRACT

A composition comprising
(a) a major quantity of aromatic polycarbonate;
(b) a minor amount of a polyalkylene terephthalate wherein the alkylene group is from 2 to about 10 carbon atoms, and is present in such quantities so as to substantially reduce the DTUL of the polycarbonate;
(c) an effective amount of a combination of impact modifier and gloss suppressant selected from an olefin diene copolymer and an acrylonitrile-butadiene-alkenylaromatic copolymer; and
(d) an effective amount of flame retardant system to maintain a VO rating for a 1.6 mm sample under UL 94 test conditions wherein the overall composition has a DTUL in °C. of less than or equal to 115° C., a 3.2 mm Notched Izod impact resistance in kilograms f-cm per cm of at least about 10, a surface gloss as measured with a Hunter Lab's gloss meter at 60° reflection of less than or equal to about 80 and a VO rating for a 1.6 mm sample under UL test conditions.

16 Claims, No Drawings

LOW GLOSS, FLAME RETERDANT, IMPACT RESISTANT POLYCARBONATE COMPOSITION

BACKGROUND OF THE INVENTION

Polycarbonate is a well known thermoplastic having excellent properties with respect to impact resistance, electrical conductivity and thermal stability, among others. Various blends of polycarbonate with other polymers and additives have been made to upgrade the properties of polycarbonate. Often times however, various properties of polycarbonate need not be upgraded but merely held within the usual range while other properties of the polycarbonate may have to be reduced in order to qualify for certain applications.

One particular property of polycarbonate is that a molded article has a glossy exterior. However for many applications of polycarbonate it is preferred and indeed specified in some instances that the exterior of certain objects, for example, business machines have a dull as opposed to glossy appearance. Additionally certain properties such as the distortion temperature under load, usually abbreviated as DTUL, be reduced instead of maintained at its relatively high point of 130° C. A lower distortion temperature under load should bring about an easier processing polymer so as to more readily make more intricate shapes and thinner sections. Additionally for many of these applications, there need not be as high an impact resistance as polycarbonate would normally have. Other properties which may be upgraded in the polycarbonate for the particular application include the hydrolytic stability, ultraviolet stability and the flame retardance. Particularly for internal usage in a business environment, the thin hulls of a business machine should be rendered flame retardant.

Therefore it is desirable to obtain a polycarbonate based composition wherein the gloss of the composition is substantially below that of polycarbonate alone, the DTUL is substantially lower than polycarbonate while maintaining a significant amount of the 3.2 mm Notched Izod impact resistance of the polycarbonate and upgrading the flame retardance of the thinnest section, 1.6 mm thick test sample.

It has now been discovered that specific compositions of polycarbonate together with other polymers and additives bring about this unusual group of properties.

SUMMARY OF THE INVENTION

In accordance with the invention there is a composition which comprises (a) a major quantity of aromatic polycarbonate;

(b) a minor amount of a polyalkylene terephthalate wherein the alkylene group is from 2 to about 10 carbon atoms, and is present in such quantities so as to substantially reduce the DTUL of the polycarbonate;

(c) an effective amount of a combination of impact modifier and gloss suppressant selected from an olefin diene copolymer and an acrylonitrile-butadienealkenylaromatic copolymer; and (d) an effective amount of flame retardant system to maintain a VO rating for a 1.6 mm sample under UL 94 test conditions wherein the overall composition has a DTUL in °C. of less than or equal to 115° C., a 3.2 mm Notched Izod impact resistance in kilograms f-cm per cm of at least about 10, a surface gloss as measured with a Hunter Lab's gloss meter at 60° reflection of less than or equal to about 80 and a VO rating for a 1.6 mm sample under UL94 test conditions.

When the olefin-diene terpolymer is present, it is preferred to have the polycarbonate vary from about 60 to 75 weight percent of the four above-mentioned components, i.e. polycarbonate, polyalkylene terephthalate, olefin diene terpolymer and flame retardant additive system. The polyalkylene terephthalate is from about 8–15 weight percent of the composition. The olefin diene terpolymer is from about 4 to 12 weight percent of the composition. The flame retardant additive system is from about 12 to 18 weight percent of the system.

Where an acrylonitrile-butadiene-alkenylaromatic copolymer serves as the impact modifier and gloss suppressing agent, the polycarbonate is preferably from about 55 to 75 weight percent of the composition. The polyalkylene terephthalate is from about 8 to 15 weight percent of the system. The acrylonitrile-butadienealkenylaromatic copolymer is from about 4 to 12 weight percent of the system. The flame retardant additive is from about 13 to about 22 weight percent of the system.

It is more preferred for the composition to have a DTUL of less than about 110° C., a 3.2 mm Notched Izod impact resistance in kgf-cm/cm of at least about 20, and a surface gloss of less than about 75 accompanied by a VO flame retardance rating in the 1.6 mm thick sample.

DETAILED DESCRIPTION OF THE INVENTION

The aromatic polycarbonates useful in the above system are well known in the art and are generally commercially available materials. These polycarbonates, as well as methods for their preparation, are described, inter alia, in U.S. Pat. Nos. 3,161,615; 3,220,973; 3,312,659, 3,312,660; 3,313,777, 3,666,614 and 3,939,672, all of which are incorporated herein by reference. These polycarbonates may be prepared by a variety of conventional and well known processes which include, inter alia, interfacial polymerization, pyridine process, transesterification, and melt polymerization. A convenient process for the preparation of these polycarbonates is the interfacial polymerization process involving the coreaction of at least one dihydric phenol with a carbonate precursor. Typically, the dihydric phenols utilized may be represented by the general formula

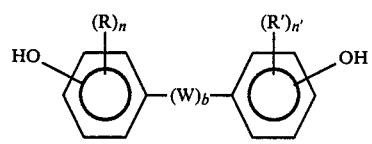

FIG. 1 wherein

R is independently selected from monovalent hydrocarbon radicals, monovalent hydrocarbonoxy radicals, and halogen radicals;

R is independently selectd from monovalent hydrocarbon radicals, monovalent hydrocarbonoxy radicals, and halogen radicals;

W is selected from divalent hydrocarbon radicals,

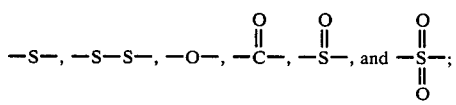

b is either zero or one; and n and n' are independently selected from integers having a value of from 0 to 4 inclusive.

The monovalent hydrocarbon radicals represented by R and R' include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals may be represented by the general formula —$OR^1$ wherein $R^1$ is a monovalent hydrocarbon radical of the type described hereinafore. Preferred monovalent hydrocarbonoxy radicals are the alkoxy and aryloxy radicals.

The divalent hydrocarbon radicals represented by W include the alkylene radicals, the alkylidene radicals, the cycloalkylene radicals, and the cycloalkylidene radicals. The preferred cycloalkylene and cycloalkylidene radicals are those containing from 6 to about 16 ring carbon atoms. The preferred alkylene radicals are those containing from 2 to about 30 carbon atoms. The preferred alkylidene radicals are those containing from 1 to about 30 carbon atoms.

Some illustrative non-limiting examples of dihydric phenols of Formula I include:
2,2-bis(4-hydroxyphenyl)propane (bisphenol-A);
bis(4-hydroxyphenyl)methane;
2,2-bis(3,5-dibromo-4-hydroxyphenyl)propane;
2,2-bis(3,5-dimethyl-4-hydroxyphenyl)propane;
1,1-bis(4-hydroxyphenyl)decane;
1,1-bis(4-hydroxyphenyl)cyclododecane;
1,5-bis(4-hydroxyphenyl)pentane;
4,4'-thiodiphenol;
1,1-bis(4-hydroxyphenyl)cyclohexane;
bis(4-hydroxyphenyl)ether; and
4,4'-dihydroxyphenyl.

Other dihydric phenols are also available and are disclosed, inter alia, in U.S. Pat. Nos. 2,999,835; 3,028,365 and 3,334,154, all of which are incorporated herein by reference.

It is, of course, possible to employ a mixture of two or more different dihydric phenols as well as individual dihydric phenols in the preparation of the instant carbonate polymers.

The carbonate precursor employed may be a carbonyl halide, a carbonate ester, or a bishaloformate. The carbonyl halides are carbonyl bromide, carbonyl chloride, and mixtures thereof. Typical of the carbonate esters are diphenyl carbonate; di(halophenyl) carbonates such as di(chlorophenyl)carbonate, di(bromophenyl) carbonate, and di(trichlorophenyl)carbonate; di(alkylphenyl)carbonates such as di(tolyl)carbonate; di(naphthyl)carbonate; di(halonaphthyl)carbonates; phenyl tolyl carbonate; chlorophenyl chloronaphthyl carbonate; and mixtures thereof.

The bishaloformates include the bis-haloformates of dihydric phenols such as bisphenol-A and hydroquinone; bishaloformates of glycols such as ethylene glycol, neopentyl glycol, and polyethylene glycol; and the like. While other carbonate precursors will occur to those skilled in the art carbonyl chloride, also known as phosgene, is the preferred carbonate precursor.

The polycarbonates of the instant invention contain at least the following recurring structural unit:

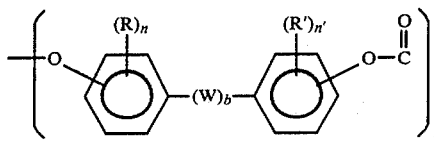

FIG. 2 wherein R, R', W, b, n and n' are as defined hereinafore. These polycarbonates generally have an intrinsic viscosity, as measured in methylene chloride at 5° C., of at least about 0.3 dl/gm, preferably from about 0.4 to about 1.0 dl/gm.

In addition to the polycarbonates described hereinafore derived from a dihydric phenol and a carbonate precursor the instant invention also includes the thermoplastic randomly branched polycarbonates. These branched polycarbonates may be obtained by the reaction of said dihydric phenol, carbonate precursor, and a minor amount of a branching agent. The branching agent is generally a polyfunctional aromatic compound containing at least three functional groups which may be hydroxyl, carboxyl, carboxylic anhydride, haloformyl, and mixtures thereof. These polyfunctional aromatic compounds are well known in the art and are described, inter alia, in U.S. Pat. Nos. 3,525,712; 3,541,049; 3,544,514; 3,635,895; 3,816,373; 4,001,184 and 4,204,047, all of which are incorporated herein by reference. Some illustrative non-limiting examples of these polyfunctional compounds include trimellitic anhydride, trimellitic acid, trimellityl trichloride, 4-chloroformyl phthalic anhydride, pyromellitic anhydride, and trimesic acid. The amount of these compounds utilized is in the range of from about 0.05 to about 2 mole percent based on the amount of dihydric phenol utilized.

The polyalkylene terephthalate serves to reduce the DTUL of the system and is at times a positive impact modifier as well. The alkylene group is from 2 to about 10 carbon atoms, preferably 2 to about 4 carbon atoms. Various polyalkylene terephthalates can be employed such as polyethylene terephthalate, polybutylene terephthalate, polyhexylene terephthalate, and the like. The preferred polyalkylene terephthalate is polybutylene terephthalate. Such polybutylene terephthalates can be obtained from General Electric Company under the trademark VALOX ® 315 polybutylene terephthalate resin.

The olefin diene terpolymer is used as an impact modifier and as a gloss suppressant. The olefin diene terpolymers used to improve the impact properties of the polycarbonate/polyester blends and suppress the gloss are well known in the art and are generally commercially available or may be readily prepared by known conventional methods. They may be prepared by the reaction of at least one olefin with a diene. The olefins used in the preparation of these terpolymers are well known olefins and include the lower olefins such as ethylene propylene, butylene and the like. The preferred olefins are those containing from 2 to about 4 carbon atoms. The dienes include the well known dienes such as butadiene, pentadiene, isoprene, cyclohexadiene, cyclopentadiene, and the norbornenes such as ethylidene norbornene. Preferred dienes are the linear dienes containing from 4 to about 10 carbon atoms and the cyclic dienes containing from 5 to about 10 ring carbon atoms. Particularly preferred dienes are the norbornenes.

Preferred olefin diene terpolymers are those belonging to the EPDM family, i.e., those derived from ethylene, propylene and a diene such as norbornene or ethylidene norbornene.

The acrylonitrile-butadiene-alkenylaromatic compound copolymers are well known. The preferred copolymers are made from acrylonitrile-butadiene-styrene and acrylonitrile-butadiene-alpha-methyl styrene. General methods for preparing these polymers are described in U.S. Pat. No. 4,107,232 and U.S. Pat. No. 3,130,177 which are incorporated by reference. The alkenyl aromatic compounds are described in U.S. Pat. No. 3,660,531 which is also incorporated by reference.

The weight percents of the acrylonitrile-butadienealkenylaromatic compound copolymers are generally from about 15-25:20- 45:65-30 and preferably 15-20:30-40:55-40. Blends containing copolymers derived from acrylonitrile-butadiene-alkenylaromatic compound and a polymer with an acrylic monomer may also be employed in the practice of the invention. For example an acrylonitrile-butadiene-styrene can be blended with a methacrylate-butadiene-styrene such as KM653 available from Rohm and Haas to make an effective gloss suppressant impact modifier. These materials are commercially available or may be made using conventional procedures.

The flame retardant system necessary to provide the proper level of flame resistance composition will generally have both a halogenated, preferably brominated covalent compound and a flame retardant salt as well. Examples of such well known halogenated compounds include decabromodiphenyl oxide, tetrabromo and/or tetrachloro diphthalimide, tetrabromobisphenol-A carbonate copolymer and the copolycarbonate of tetrabromobisphenol-A and bisphenol-A. A preferred copolymer is a 50 weight percent bromine copolycarbonate of tetrabromobisphenol-A and bisphenol-A having an I.V. (intrinsic viscosity) of about 0.37 dl/g as measured in methylene chloride at 25° C. Examples of such flame retardant salts include the perfluoroaliphatic sulfonic acid salt, i.e. potassium perfluorooctylsulfonate, and aromatic sulfonic acid salts well illustrated in the patent literature and exemplified by potassium diphenylsufone sulfonate and sodium 2,4,5-trichlorobenzene sulfonate.

Also present in the flame retardant systems can be other polymers such as ethylene vinylacetate, polyvinyl chloride and the like as well as metallic inorganic compounds which are known to be good flame retardant boosters such as antimony, for example antimony oxide and other similar materials. Usually these flame retardant systems can be readily available in the form of a concentrate which includes flame retardants, boosters and/or drip inhibitors.

The percentage of each in the flame retardant system can vary significantly as long as a VO at 1.6 mm under UL-94 testing conditions is achieved. Examples of flame retardant systems include DB III, a system available from Anzon America, Freehold, New Jersey, which is decabromo diphenyl oxide, ethylene vinyl acetate and antimony oxide. Blended together with DB III is a flame retardant salt such as sodium trichlorobenzene sulfonate. Another effective system is the previously mentioned flame retardant salt with the copolycarbonate of 3,3'5',5'-tetrabromobisphenol-A and bisphenol-A. Also present in the flame retarding composition is a small quantity of an anti- dripping agent to achieve VO in the very thin test system employed. Small quantities of polytetrafluoroethylene (TEFLON ®) preferably in its fibrile form therefore are also present. Amounts up to about 0.15% of the composition can be employed without significant demonstrable effect on the composition's properties.

EXAMPLES

Below are various control examples as well as examples of the invention. In the controls and examples of the invention, the composition's components are mixed together and extruded at 260° C. The various test pieces are then injection molded at 280° C. into the various shapes necessary for the test systems. DTUL is measured according to ASTM D648. Notched Izod is measured according to ASTM D256. Surface gloss is measured on a piece 50.8 mm by 76.2 mm by 3.2 mm on a Hunter Lab's gloss meter at 60° reflection. In the Tables below the PBT is VALOX ® 315 polybutylene terephthalate resin obtained from General Electric Company. The polycarbonate (PC) employed is bisphenol-A polycarbonate resin with an intrinsic viscosity of 0.49-0.52 in methylene chloride at 25° C. stabilized with a small quantity of phosphite, obtained from General Electric Company as LEXAN ® 145. The olefin diene copolymer (EPDM) is an ethylene propylene ethylidene norbornene having 4-6% of the ethylidene norbornene and available from Exxon as Vistalon 3708. The acrylonitrile-butadiene-styrene (ABS), Blendex 301 from Borg Warner contains about 24 weight % acrylonitrile, 34 weight % butadiene and about 42 weight % styrene. The butadiene-styrene-methyl methacrylate core shell polymer which can be employed has a general range of from about 40-60 weight percent butadiene, 20-35 weight percent styrene and 20-25 weight percent methyl methacrylate. An example of such a polymer is KM653 available from Rohm and Haas. The flame retardant agent used in the first Table is a combination of sodium trichloro benzene sulfonate [0.5 weight %, of (a), (b), (c) and (d) together] and DB III (a concentrate obtained from Anzon America having a composition of decabromodiphenyl oxide 58 weight %, antimony oxide 29 weight %, and ethylene vinyl acetate copolymer 13 weight %). In Table 2 the flame retardant is either TB50, a 50:50 weight % copolycarbonate of 3,5,3',5'-tetrabromobisphenol-A and bisphenol-A or FR-25, a 3,5,3',5'-tetrabromobisphenol-A oligomer containing 58 weight % bromine with tribromo phenol endcap obtained from Mitsubishi Chemical or the previously mentioned DB III. Sodium trichlorobenzene sulfonate is also present with the brominated oligomers. In each of the Examples, control and invention, 0.06 weight % polytetrafluoroethylene (Teflon) of the fibrile type was employed as measured by weight percent of (a), (b), (c) and (d) together. Below are the results.

TABLE 1

| SAMPLE CONTROL | COMPOSITION WT. % | | | | PROPERTIES | | | |
|---|---|---|---|---|---|---|---|---|
| | PC | PBT | EPDM | DBIII | DTUL °C. | NI 3.2 mm kg · f cm/cm | GLOSS 60° | UL94 |
| 1 | 100 | — | — | — | 136 | 81.7 | >100 | V2 |
| 2 | 90 | — | 10 | — | 132 | 76.2 | 44 | HB |

TABLE 1-continued

| SAMPLE CONTROL | COMPOSITION WT. % | | | | PROPERTIES | | | |
|---|---|---|---|---|---|---|---|---|
| | PC | PBT | EPDM | DBIII | DTUL °C. | NI 3.2 mm kg·f cm/cm | GLOSS 60° | UL94 |
| 3 | 85 | — | — | 15 | 121 | 51.7 | >100 | VO |
| 4 | 75 | — | 10 | 15 | 119 | 21.8 | 31 | VO |
| 5 | 75 | — | 5 | 20 | 114 | 4.4 | 24 | VO |
| 6 | 75 | 10 | — | 15 | 101 | 24.5 | 94 | VO |
| Example | | | | | | | | |
| 1 | 65 | 10 | 10 | 15 | 100 | 28.8 | 54 | VO |
| 2 | 70 | 10 | 5 | 15 | 98 | 20.1 | 70 | VO |

TABLE 2

| SAMPLE CONTROL | COMPOSITION WT. % | | | | | | | PROPERTIES | | | |
|---|---|---|---|---|---|---|---|---|---|---|---|
| | PC | PBT | ABS | KM653 | TB50 | FR25 | DBIII | DTUL °C. | NI 3.2 mm kg·f cm/cm | GLOSS 60° | UL94 |
| 1 | 100 | — | — | — | — | — | — | 136 | 81.7 | >100 | V2 |
| 2 | 70 | — | 10 | — | 20 | — | — | 132 | 74.6 | 62 | VO |
| 3 | 90 | — | 10 | — | — | — | — | 123 | 74.6 | 52 | HB |
| 4 | 70 | 10 | 5 | — | 15 | — | — | 110 | 37.6 | 69 | V2 |
| 5 | 75 | 10 | — | — | 15 | — | — | 101 | 24.5 | 94 | VO |
| Example | | | | | | | | | | | |
| 1 | 60 | 10 | 10 | — | 20 | — | — | 114 | 64.8 | 45 | VO |
| 2 | 70 | 10 | 5 | — | — | 15 | — | 107 | 14.2 | 65 | VO |
| 3 | 55 | 10 | 5 | 10 | — | — | 20 | 93 | 68.0 | 77 | VO |
| 4 | 65 | 10 | 5 | — | — | 20 | — | 110 | 11.0 | 68 | VO |

What is claimed is:

1. A composition comprising
   (a) a major quantity of aromatic polycarbonate;
   (b) a minor amount of a polyalkylene terephthalate wherein the alkylene group is from 2 to about 10 carbon atoms, and is present in such quantities so as to substantially reduce the DTUL of the polycarbonate;
   (c) an effective amount of a combination of impact modifier and gloss suppressant selected from an olefin diene copolymer and an acrylonitrile-butadienealkenylaromatic copolymer; and
   (d) an effective amount of flame retardant system to maintain a VO rating for a 1.6 mm sample under UL 94 test conditions wherein the overall composition has a DTUL in °C. of less than or equal to 115° C., a 3.2 mm Notched Izod impact resistance in kilograms f-cm per cm of at least about 10 and has a surface gloss as measured with a Hunter Lab's gloss meter at 60° reflection of less than or equal to about 80 wherein the olefin diene copolymer is present and (a) is from about 60 to 75 weight percent, (b) is from about 8 to 15 weight percent, (c) is from about 4 to 12 weight percent and (d) is from about 12 to 18 weight percent, all weight percents measured on the total of (a), (b), (c), and (d) or wherein the acrylonitrile-butadiene-alkenyl- aromatic copolymer is present and (a) is from about 55 to 75 weight percent, (b) is from about 8 to 15 weight percent, (c) is from about 4 to 12 weight percent and (d) is from about 13 to 22 weight percent, all weight percent measured on the total of (a), (b), (c) and (d).

2. The composition of claim 1 wherein the polyalkylene terephthalate is polyethylene terephthalate or polybutylene terephthalate, the olefin diene copolymer is an ethylene propylene diene terpolymer, and the acrylonitrile-butadiene-alkenylaromatic copolymer is acrylonitrile-butadiene-styrene.

3. The composition in accordance with claim 1 wherein the DTUL is less than about 110° C., the 3.2 mm Notched Izod impact resistance is at least about 20 kgf-cm/cm/ and the surface gloss is less than about 75.

4. The comoosition in accordance with claim 1 wherein effective quantities of a drip retarding agent is present.

5. The composition in accordance with claim 3 wherein effective quantities of a drip retarding agent is present.

6. The composition in accordance with claim 1 wherein (a) comprises bisphenol-A polycarbonte.

7. The composition in accordance with claim 1 wherein (b) comprises polybutylene terephthalate.

8. The composition in accordance with claim 1 wherein (c) compises ethylene propylene ethylidene norbornene.

9. The comosition in accordance with claim 1 wherein (c) compises acrylonitrile-butadiene-styrene.

10. The composition in accordance with claim 1 wherein (d) comprises a combination of a flame retardant salt and a brominated compound or oligomer.

11. The combosition in accordance with claim 10 wherein an antimony compound is also present.

12. The composition in accordance with claim 6 wherein (b) comprises polybutylene terephthalate.

13. The comosition in accordance with claim 12 wherein (c) comprises ethylene propylene ethylidene norbornene copolymer.

14. The composition in accordance with claim 12 wherein (c) comprises acrylonitrile-butadiene-styrene copolymer.

15. The composition in accordance with claim 13 wherein (d) comprises a flame retardant salt and a brominated compoound or oligomer.

16. The composition in accordance with claim 14 wherein (d) comprises a flame retardant salt and a brominated compound or oligomer.

* * * * *